(12) United States Patent
Drenth (10) Patent No.: US 11,144,692 B2
(45) Date of Patent: Oct. 12, 2021

(54) CO-SIMULATION SYSTEM WITH DELAY COMPENSATION AND METHOD FOR CONTROL OF CO-SIMULATION SYSTEM

(71) Applicant: Volvo Car Corporation, Gothenburg (SE)

(72) Inventor: Edo Drenth, Helsingborg (SE)

(73) Assignee: Volvo Car Corporation, Gothenburg (SE)

( * ) Notice: Subject to any disclaimer, the term of this patent is extended or adjusted under 35 U.S.C. 154(b) by 467 days.

(21) Appl. No.: 16/259,439

(22) Filed: Jan. 28, 2019

(65) Prior Publication Data

US 2019/0236228 A1    Aug. 1, 2019

(30) Foreign Application Priority Data

Jan. 30, 2018    (EP) .................................... 18154086

(51) Int. Cl.
*B60T 7/12*    (2006.01)
*G06F 30/33*    (2020.01)
(Continued)

(52) U.S. Cl.
CPC ......... *G06F 30/33* (2020.01); *F02D 41/1401* (2013.01); *G06F 30/15* (2020.01);
(Continued)

(58) Field of Classification Search
CPC .. G06F 17/5095; G06F 17/5009; G06F 17/50; F02D 41/1401; F02D 2041/1432;
(Continued)

(56) References Cited

U.S. PATENT DOCUMENTS

| 4,665,703 A  * | 5/1987 | David ................... F01B 3/0079 |
| | | 123/46 R |
| 6,534,958 B1 * | 3/2003 | Graber ...................... H02P 9/48 |
| | | 322/11 |
| 2015/0300226 A1* | 10/2015 | Ben-Haim .............. F01N 3/028 |
| | | 422/108 |

FOREIGN PATENT DOCUMENTS

| EP | 2442248 A1 | 4/2012 |
| EP | 3136267 A1 | 3/2017 |
| (Continued) | | |

OTHER PUBLICATIONS

Jun. 29, 2018 European Search Report issue on International Application No. EP18154086.

(Continued)

*Primary Examiner* — John Kwon
(74) *Attorney, Agent, or Firm* — Clements Bernard Walker; Christopher L. Bernard (57) ABSTRACT

A method of providing stable communication between subsystems in a co-simulation system, including providing a signal $S_1$ describing an output angular velocity of a rotating body of the first physical system; filtering the signal $S_1$ using a continuous moving average, CMA, filter; and forming a time discrete first output signal $S_1^*$. In a second subsystem the signal $S_1^*$ is received and the angular velocity described by $S_1^*$ is applied to the second physical system. A response signal $S_2^*$ describes a torque generated by the second subsystem. The response signal $S_2^*$ is received by the first subsystem where a time discrete feedback signal $S_F^*$ is formed based on the difference between the response signal $S_2^*$ and a time discrete damping signal $S_D^*$.

15 Claims, 6 Drawing Sheets

(51) Int. Cl.
    *G09B 25/02*         (2006.01)
    *G09B 23/10*         (2006.01)
    *G06F 30/15*         (2020.01)
    *F02D 41/14*         (2006.01)
    *G06F 117/08*       (2020.01)

(52) U.S. Cl.
    CPC ............. *G09B 23/10* (2013.01); *G09B 25/02* (2013.01); *F02D 2041/1437* (2013.01); *F02D 2250/14* (2013.01); *G06F 2117/08* (2020.01)

(58) Field of Classification Search
    CPC ..... F02D 2041/1433; F02D 2041/1437; F02D 2041/288; F02D 2250/14
    See application file for complete search history.

(56) References Cited

FOREIGN PATENT DOCUMENTS

WO     20140170188 A1     10/2014
WO     2017114883 A1     7/2017

OTHER PUBLICATIONS

Martin Kramer et al., Interfacing Real-Time Systems for Advanced Co-Simulation—The ACOSAR Approach, Sep. 3, 2016, pp. 1-8.
Edo Drenth, Virtual Vehicle Architecture, SVEA Vehicle Dynamics Seminar 2016, Apr. 30, 2016, pp. 1-16.

\* cited by examiner

CO-SIMULATION SYSTEM WITH DELAY COMPENSATION AND METHOD FOR CONTROL OF CO-SIMULATION SYSTEM

CROSS-REFERENCE TO RELATED APPLICATION

The present patent application/patent claims the benefit of priority of co-pending European Patent Application No. 18154086.5, filed on Jan. 30, 2018, and entitled "CO-SIMULATION SYSTEM WITH DELAY COMPENSATION AND METHOD FOR CONTROL OF CO-SIMULATION SYSTEM," the contents of which are incorporated in full by reference herein.

TECHNICAL FIELD

The present invention relates to a method for control and co-simulation of physical systems. In particular, the present invention relates to a method for providing stability in the connection of subsystems in a control or co-simulation system.

BACKGROUND ART

The automotive industry is increasing its pace in product development. At the same time an increasing number of mechatronic systems are deployed in the final product. These systems are developed virtually and have to be integrated in purpose driven integration platforms with purpose driven fidelity simulation models. The introduction of an interface standard, the so called functional mock-up interface (FMI), is an enabler for this process to be deployed on a wider scale.

The used simulation models of physical systems are created in domain specific authoring tools. These tools are used for its fit for purpose numerical solvers. Because the physical systems mainly are modeled in continuous time domain, the resulting co-simulation models are in fact sampled systems. For this reason it is common knowledge to limit the bandwidth of the modeled system to fit well within the Nyquist frequency.

However, co-simulation of, for instance, mechanical systems have strongly coupled interfaces. In the particular case when motion signals are input, resulting forces and/or torques (or vice versa) have to be fed back. But, the applied motions (or forces and/or torques) create continuous time step responses which induce noise with a relatively large bandwidth.

Moreover, with a number of different proprietary co-simulation interfaces previously available, there was a need for an open standard API known as Functional Mockup Interface (FMI) mentioned above. The open standards allow sharing and distributing simulation models to support foremost mechatronic development of systems with ever increasing complexity. Due to networked controllers, multiple domains are also physically connected.

However, with the increasing availability of co-simulation models using a common interface, there is also an increasing uncertainty as to the functionality and behaviour of such subsystems which may cause problems when connecting subsystems from different manufacturers and with different properties. A particular subsystem may then be treated as a black box defined only by its inputs and outputs. When connecting two subsystems, interface instabilities may occur due to the round trip delay incurred by the sampling of the subsystems.

Instability issues may for example be caused by large inductance/inertia ratios where sampling incurs pure time delays. Hence the open system of the connection can be analyzed in view of stability by a Nyquist plot. This Nyquist plot reveals that phase is important and that it can be reduced by either faster sampling or changing the causality of the interface between subsystems. Changing causality on the fly, however, is very difficult and requires a clever master system to integrate multiple models. Cases where faster sampling is possible from a technical point of view, often become inviable from a performance perspective.

Accordingly it is desirable to alleviate or eliminate problems relating to instabilities which may occur in the interface between two subsystems, and in particular in the interface between a known subsystem and a black box subsystem.

SUMMARY

In view of above-mentioned and other drawbacks of the prior art, it is an object of the present invention to provide an improved method of co-simulation and a co-simulation system providing a stable interface between subsystems.

According to a first aspect of the invention, there is provided a method of providing stable communication between subsystems in a co-simulation system comprising a plurality of subsystems, each subsystem representing a physical vehicle system. The method comprises: in a first subsystem of the co-simulation system, simulating a first physical system, providing a first time continuous signal $S_1$ describing a first output angular velocity of a rotating body of the first physical system; filtering the first time continuous signal $S_1$ using a continuous moving average, CMA, filter and forming a time discrete first output signal $S_1^*$. In a second subsystem of the co-simulation system, simulating a second physical system, receiving the time discrete first output signal $S_1^*$ from the first subsystem, applying the angular velocity described by the time discrete first output signal to the second physical system, and providing a time discrete response signal $S_2^*$ from the second subsystem describing a torque generated by the second subsystem. In the first subsystem, receiving the response signal $S_2^*$ and forming a time discrete feedback signal $S_F^*$ based on the difference between the response signal $S_2^*$ and a time discrete damping signal $S_D^*$, wherein forming the damping signal $S_D^*$ comprises applying an inertia to the rotating body of the first physical system, resulting in a time continuous damping signal $S_D$ representing a torque, followed by filtering the time continuous damping signal $S_D$ using a CMA-filter and applying a unit delay to form the time discrete damping signal $S_D^*$, thereby synchronizing $S_D^*$ with $S_2^*$; applying the time discrete feedback signal $S_F^*$ as a torque to the rotating body.

The present invention will be discussed with reference to the angular mechanical energy domain. However, the general principles of the described co-simulation methods are equally applicable for simulations of systems operating in other energy domains, such as the linear mechanical, electromagnetic and hydraulic/pneumatic energy domains. The translation between different energy domains can be described by power bonds and bond graph theory describing variables and constants in different energy domains. In the present context, the angular velocity and torque correspond to the generalized flow and effort, respectively.

The power bond in the co-simulation of physical systems, i.e. the interface between subsystems, is sensitive to the round trip delay incurred by the sampling. In other words; in the first subsystem, the angular velocity (flow) is measured and forwarded to the next subsystem. With a correctly tuned speed generator of the second subsystem, a torque (effort) is generated to have the same angular velocity as the driving entity. The generated torque is fed back to the inertia (inductance) of origin as a torque, i.e. to the first subsystem. In cases where the inertia of the first subsystem is small, the torque fed back may accelerate a body of the first subsystem excessively. It should be noted that the torque required to synchronize the secondary inertia is higher than the torque required to accelerate the first inertia one sample earlier. Thereby, this process is oscillatory self-amplifying and unstable when the sampling period is too long. Furthermore, the origin inertia can accelerate fast under a sample period since the connected load is sensed a sample later.

Accordingly, the present invention is based on the realization that the overall system can be compensated for the sampling time delay by forming a feedback signal $S_F^*$ based on the torque output from the second subsystem and a damping signal, and by applying the feedback signal as a torque to the rotating body (i.e. inertial mass) of the first subsystem. Thereby, the acceleration of the inertial mass of the first subsystem is limited for a given sampling period by means of the damping signal. If no second subsystem was to be connected to the first subsystem, the described damping signal would only influence the system's response time to an applied driving torque, but not affect the steady-state values.

According to one embodiment of the invention, the inertia is modeled by a spring-damper resonator system, which may also be referred to as a tuned inertia damper, TID. The inertia of the tuned inertia damper preferably has a value comparable to the maximum inertia sensed at the output second subsystem.

According to one embodiment of the invention, a natural frequency of the spring damper resonator system is higher than a Nyquist frequency for a sampling rate of the co-simulation system.

According to one embodiment of the invention the continuous moving average, CMA, filter is an energy conserving filter. Thereby, by the above co-simulation method, energy conservation is achieved which improves the overall stability of the system. In particular, the above discussed CMA-filter is configured to not deteriorate the energy transfer over the interface between the first and the second subsystem.

According to one embodiment of the invention, the co-simulation system may simulate an automotive transmission system which is a system where co-simulation may be required to accurately simulate the transmission system.

According to one embodiment of the invention, the inertia may be an estimated inertia based on a torque output from the second subsystem. Thereby, the damping signal can be adapted and tuned based on the properties of the second subsystem which further improves the stable working envelope of the connection between the two subsystems.

According to one embodiment of the invention, the method may further comprise, in the first subsystem: determining a time discrete acceleration signal $A_1^*$ of the first time discrete output signal $S_1^*$; filtering the time discrete acceleration signal $A_1^*$ with a time discrete moving average, DMA, filter; determining a torque of the second subsystem from the response signal $S_2^*$; and estimating the inertia based on the time discrete acceleration signal $A_1^*$ and the torque from the time discrete response signal $S_2^*$. Thereby, the damping signal can be more accurately determined. The DMA-filter is a time discrete equivalent to the above discussed time continuous CMA-filter, and will thereby also be energy conserving. The described pre-conditioning of $A_1^*$ synchronizes both signals in time and frequency characteristics content, meaning that the CMA-filter and DMA-filter have the identical signal transfer for sampled signals.

According to one embodiment of the invention, the method may comprise determining a time discrete acceleration signal $A_1^*$ of the first time discrete output signal $S_1^*$, filtering the time discrete acceleration signal $A_1^*$ with a time discrete moving average, DMA, filter; determining a discrete time derivative of the acceleration signal $A_1^*$, determining a discrete time derivative of the response signal $S_2^*$; and estimating the inertia based on the time derivative of the acceleration signal, and the time derivative of the response signal. The time derivative of the acceleration, which may also be referred to as jerk, is a finite difference of $A_1^*$ since $A_1^*$ is a time discrete signal:

$$\frac{1-1/z}{h} A_1^*$$

where z is a shift operator and h is the sample time. By using jerk to estimate the inertia, low frequency noise is removed. The presented embodiment is thus similar to the embodiment described above where the time discrete acceleration signal $A_1^*$ is used to estimate the inertia. The discrete derivative of $S_2^*$ is determined in the same manner as for $A_1^*$.

According to one embodiment of the invention, the second subsystem may be black box system meaning that nothing is known of the internal workings of the second subsystem, it is only defined by the output signal provided in response to an input signal. It is however assumed that the second subsystem comprises a rotational body to which the input signal is applied. Since the second subsystem represents a second physical system having an unknown inertia, the resulting change in angular velocity and torque is also unknown and by means of the described method a large difference between an inertia of the first subsystem and an inertia of the second subsystem can be handled while reducing undesirable oscillations and system instabilities.

According to a second aspect of the invention, there is provided a co-simulation system comprising a plurality of subsystems, each subsystem representing a physical vehicle system. The co-simulation system comprises: a first subsystem of the co-simulation system, configured to simulate a first physical system, providing a first time continuous signal $S_1$ describing a first output angular velocity of a rotating body of the first physical system; a continuous moving average, CMA, filter configured to filter the first time continuous signal $S_1$ to form a time discrete first output signal $S_1^*$; a second subsystem of the co-simulation system, configured to simulate a second physical system, the second subsystem being configured to receive the time discrete first output signal $S_1^*$ from the first subsystem, apply the angular velocity described by the time discrete first output signal to the second physical system, and provide a time discrete response signal $S_2^*$ from the second subsystem describing a torque generated by the second subsystem. The first subsystem is further configured to: receive the response signal $S_2^*$ and to form a time discrete feedback signal $S_F^*$ based on the difference between the response signal $S_2^*$ and a time discrete damping signal $S_D^*$, wherein the damping signal $S_D^*$ is formed by applying an inertia to the rotating body of the first physical system, resulting in a time continuous damping signal $S_D$ representing a torque, followed by filtering the time continuous damping signal $S_D$ using a CMA-filter and applying a unit delay to form the time discrete damping signal $S_D^*$, thereby synchronizing $S_D^*$ with $S_2^*$; apply the time discrete feedback signal $S_F^*$ as a torque to the rotating mass.

Additional effects and features of the second aspect of the invention are largely analogous to those described above in connection with the first aspect of the invention.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DESCRIPTION OF EMBODIMENTS

In the present detailed description, various embodiments of the co-simulation system and the method for providing stable communication according to the present invention are mainly described with reference to a co-simulation system simulating an automotive transmission system operating in the angular mechanical energy domain.

Figure 1:
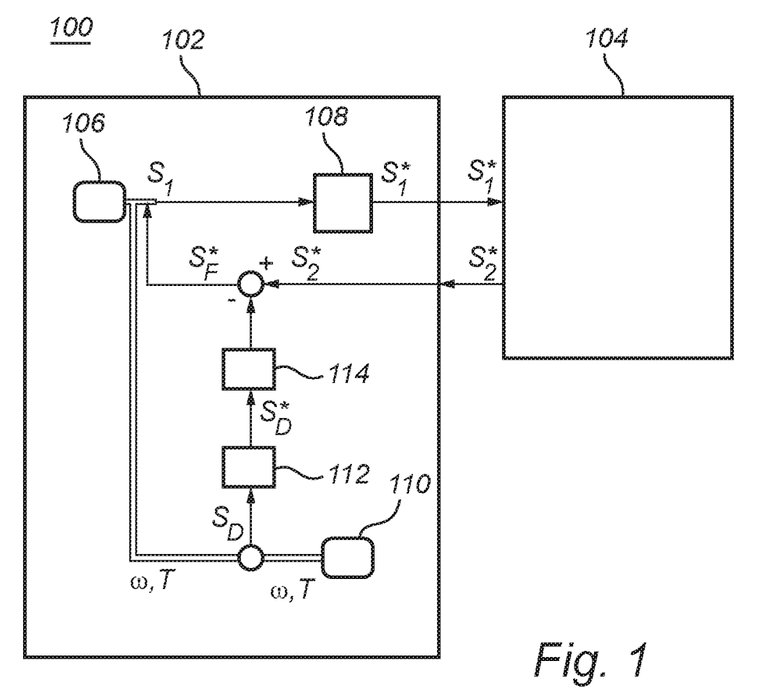
FIG. 1 is a block diagram schematically illustrating a co-simulation system according to an embodiment of the invention.
Figure 2:
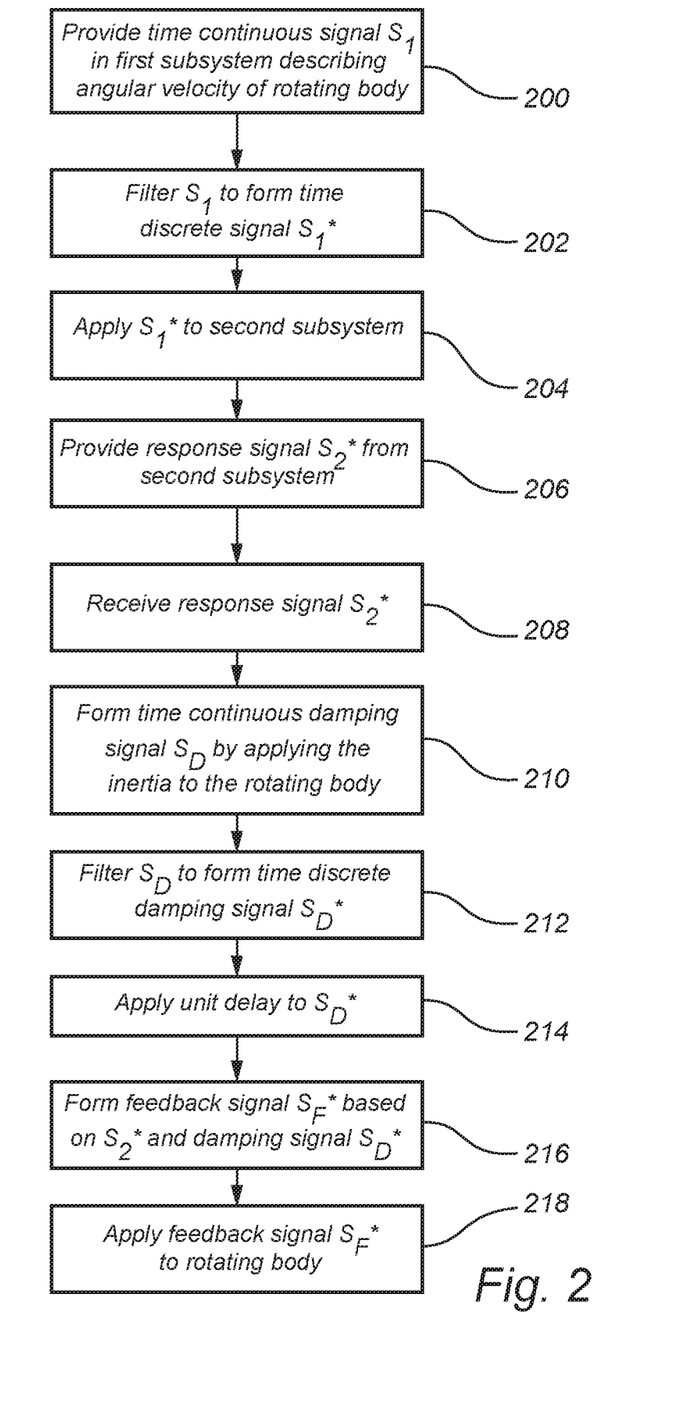
FIG. 2 is a flow chart outlining the general steps of a method according to an embodiment of the invention.

FIG. 1 schematically illustrates a co-simulation system 100 according to an embodiment of the invention and FIG. 2 is a flow chart outlining the general steps of a method according to an embodiment of the invention.

In particular, FIG. 1 illustrates a first subsystem 102 of the co-simulation system 100, simulating a first physical system and a second subsystem 104 simulating a second physical system. In the present exemplifying description, the first subsystem 102 simulates an engine with a crank shaft having a rotating body 106 and the second subsystem 104 simulates a gearbox and possibly also the remaining components required to form a complete vehicle. It should however be understood that the described method comprising signal conditioning to reduce the risk of undesirable behavior at the interface between subsystems can be applied for a wide range of applications and energy domains.

The method comprises, in the first subsystem 102 of the co-simulation system 100, providing 200 a first time continuous signal $S_1$ describing a first output angular velocity of the rotating body 106 of the first physical system. The signal $S_1$ is acquired by determining the angular velocity of the rotating body 106. Next, the time continuous signal $S_1$ is filtered 202 using an energy conserving continuous moving average, CMA, filter 108 and sampled to form a time discrete first output signal $S_1^*$. In the following description, any time discrete signal can be assumed to be extrapolated as a Zero-Order-Hold (ZOH) discrete signal when required. Moreover, signals notated with a star (*) superscript describe time discrete signals and signal notations with no superscript are time continuous signals. Moreover, the functionality of the CMA-filter 108 is described in detail in EP3136267. In short, the CMA-filter 108 acts as an energy conserving anti-aliasing filter.

In the next step, the second subsystem 104 of the co-simulation system 100, simulating a second physical system, receives the time discrete first output signal $S_1^*$ from the first subsystem, where the angular velocity described by $S_1^*$ is applied 204 to the second physical system 104. The second subsystem 104 can be assumed to comprise a rotating mass to which the angular velocity is applied.

Accordingly, the crank shaft angular velocity $S_1^*$ is provided to the second subsystem 104 representing a gearbox. The gearbox will then provide 206 a time discrete response signal $S_2^*$ representing a generated torque load which is subsequently provided to the first subsystem 102, i.e. the engine. The described example is typically numerically stable for low gears, but the described system will gradually deteriorate with increasing gears unless the described method including delay compensation is applied. It can be assumed that the second subsystem 104 comprises a filter corresponding to the above described CMA-filter 108 in order to provide a time discrete output signal $S_2^*$ being compatible with the first subsystem 102. In applications where the second subsystem 104 is not equipped with an internal CMA-filter, such a filter can be inserted if intermediate solver steps of the second subsystem 104 are available where $S_2$ is represented rather than $S_2^*$.

In the first subsystem 102, the response signal $S_2^*$ is received and a time discrete feedback signal $S_F^*$ is formed 216 based on the difference between the response signal $S_2^*$ and a time discrete damping signal $S_D^*$. Forming the damping signal $S_D^*$ comprises applying 210 an inertia, J, from an inertia block 110 to the rotating body 106 of the first physical system having the first output angular velocity, i.e. $S_1$, resulting in a time continuous damping signal $S_D$ representing a torque. Next, the time continuous damping signal $S_D$ is filtered 212 using a CMA-filter 112 followed by applying a unit delay 114 to the filtered signal to form the time discrete damping signal $S_D^*$. The time delay is applied in order to synchronize $S_D^*$ with $S_2^*$. Thereby, the feedback signal $S_F^*$ can be formed as $S_F^* = S_2^* - S_D^*$. In the final step, the time discrete feedback signal $S_F^*$ is applied 218 as a torque to the rotating body 106.

Figure 3:
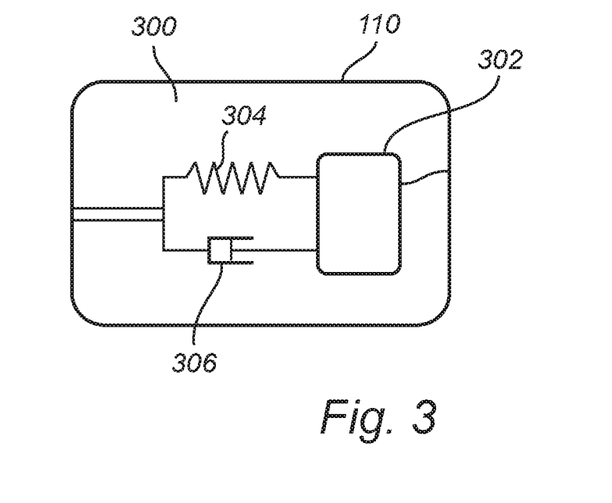
FIG. 3 is a block diagram schematically illustrating features of a co-simulation system according to an embodiment of the invention.

FIG. 3 schematically illustrates an example embodiment where the inertia block 110 is modeled by a spring-damper resonator system 300 comprising a mass 302 (representing an inertia, J), a spring 304 and a damper 306. The parameters of the spring-damper resonator system 300 are selected such that a natural frequency of the spring damper resonator system 300 is higher than a Nyquist frequency for a sampling rate of the co-simulation system 100.

Figure 4:
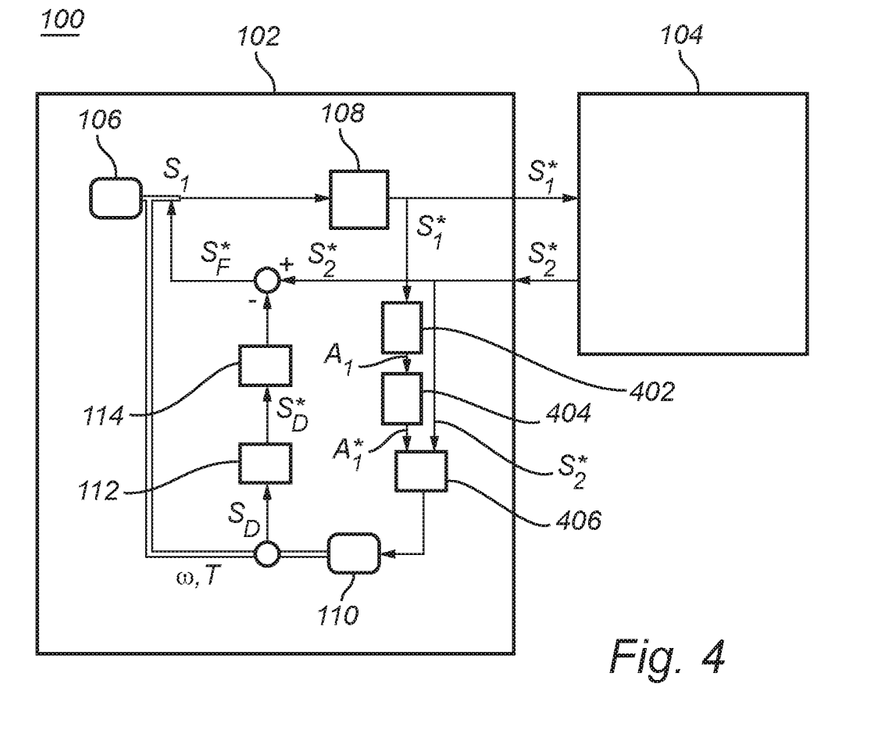
FIG. 4 is a block diagram schematically illustrating a co-simulation system according to an embodiment of the invention.

FIG. 4 schematically illustrates a co-simulation system 100 further comprising functionality for estimating the inertia based on the angular velocity $S_1^*$ of the rotating mass and on the response signal $S_2^*$ from the second subsystem. FIG. 4 will be discussed with reference to the flow chart of FIG. 5A outlining additional steps of a method according to an embodiment of the invention.

Figure 5A:
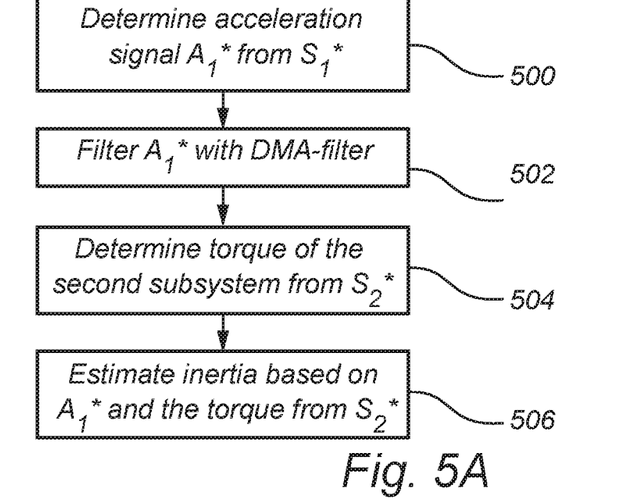
FIGS. 5A-B are flow charts outlining steps of methods according to embodiments of the invention.

First, a time discrete acceleration signal $A_1^*$ of the first time discrete output signal $S_1^*$ is determined in 500 in an acceleration block 402. The time discrete acceleration signal $A_1^*$ is filtered 502 using a time discrete moving average, DMA, filter 404, which is a time-discrete equivalent of the above described CMA-filter 108. An output torque of the second subsystem 104 is determined 504 from the response signal $S_2^*$. Finally, the inertia value is estimated 506 in an estimation block 406 based on the time discrete acceleration signal $A_1^*$ and the torque from the time discrete response signal $S_2^*$. The inertia is then provided in the inertia block 110. A good estimation of the inertia is an inertia value that mitigates oscillatory instabilities and which does not impact the actual acceleration of the entire system significantly. E.g., while shifting through gears the aim is for the estimated inertia to follow the effective and sensed inertia. If the inertia does not follow the sensed inertia, the acceleration capacity at low gears would be impacted negatively. The motivation is thus to allow for the variable inertia to match the actual sensed load when the load has dynamically changing inertia with a significant spread.

Figure 5B:
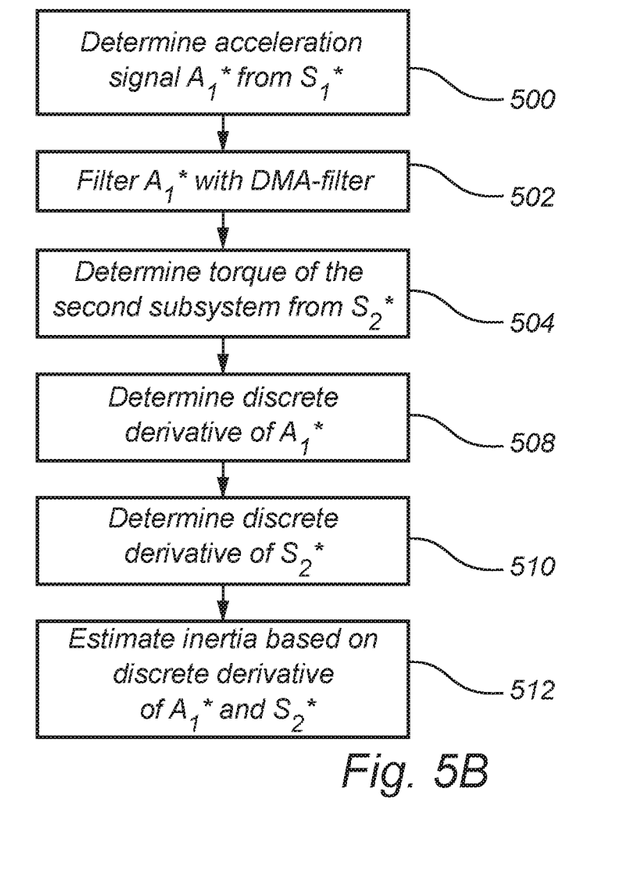

The flow chart of FIG. 5B outlines the steps of a method of estimating the inertia according to an embodiment of the invention. The method comprises determining 500 a time discrete acceleration signal $A_1^*$ of the first time discrete output signal $S_1^*$, filtering 502 the time discrete acceleration signal $A_1^*$ with a time discrete moving average, DMA, filter, determining 508 a discrete time derivative of the acceleration signal $A_1^*$, determining 510 a discrete time derivative of the response signal $S_2^*$, and estimating 512 the inertia based on the discrete time derivative of the acceleration signal $A_1^*$ and the discrete time derivative of the response signal $S_2^*$.

Figure 6A:
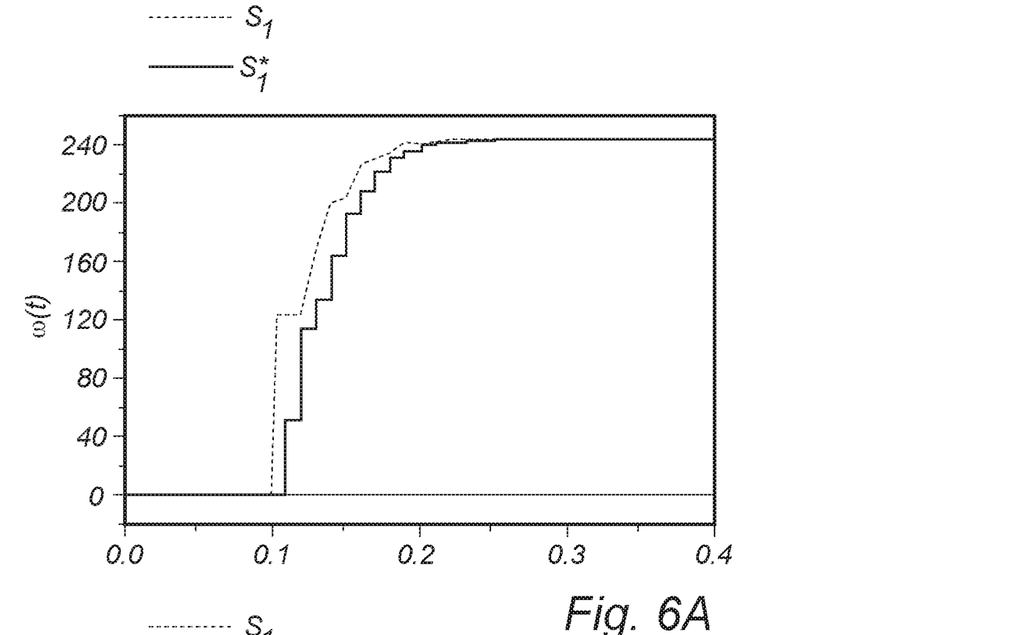
FIGS. 6A-B are diagrams schematically illustrating signals of a system according to an embodiment of the invention.
Figure 6B:
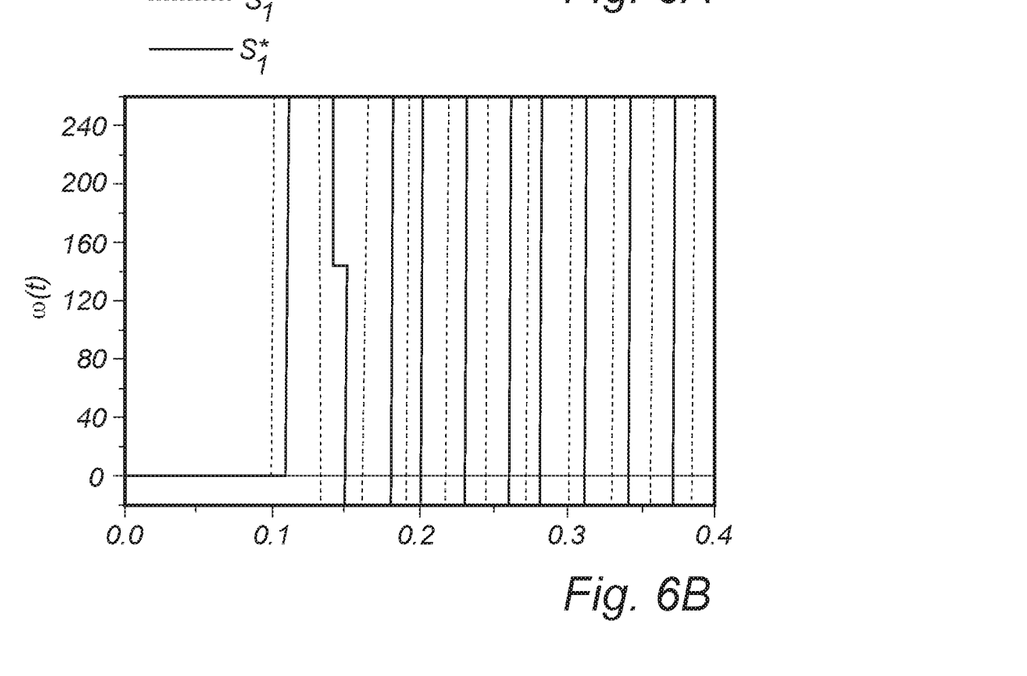

FIG. 6A is a diagram illustrating the time continuous angular velocity signal $S_1$ at the rotating mass 106 and the resulting CMA-filtered time discrete angular velocity signal $S_1^*$. For comparison, FIG. 6B illustrates the same signals $S_1$ and $S_1^*$ in a co-simulation system without the delay compensation provided by the described method employing the feedback signal $S_F^*$. In FIG. 6B, the signals $S_1$ and $S_1^*$ exhibit an oscillatory an unstable behavior.

Figure 7:
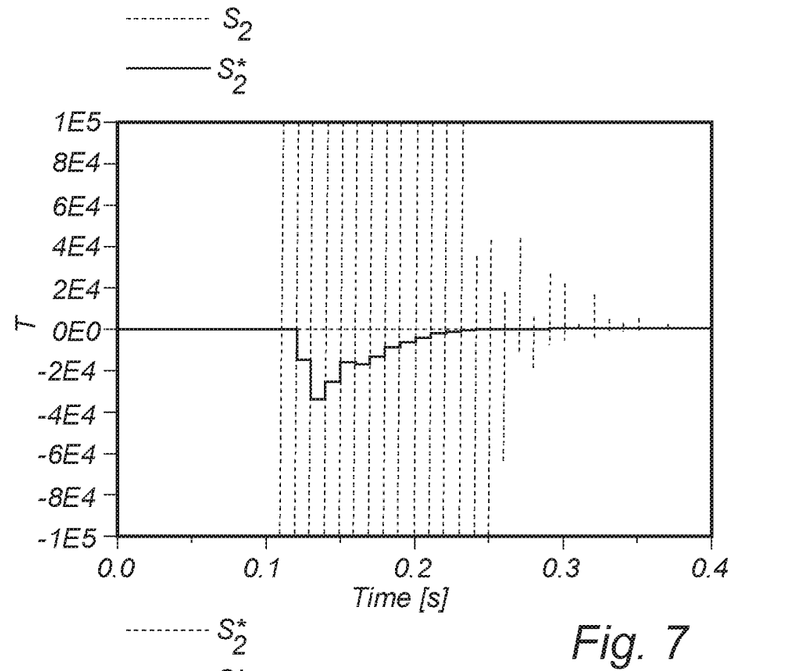
FIG. 7 is a diagram schematically illustrating signals of a system according to an embodiment of the invention.

FIG. 7 is a diagram illustrating $S_2$ representing a torque measured at a rotating mass (not shown) of the second subsystem 104. It can be seen that the torque comprises high spikes in amplitude. FIG. 7 further illustrates $S_2^*$ representing the torque output from the second subsystem, which results from CMA-filtering of the signal $S_2$. As is clear from FIG. 7, the CMA-filtered signal $S_2^*$ has a very different behavior compared to $S_2$ since the CMA-filter will average the spikes over two samples.

Figure 8:
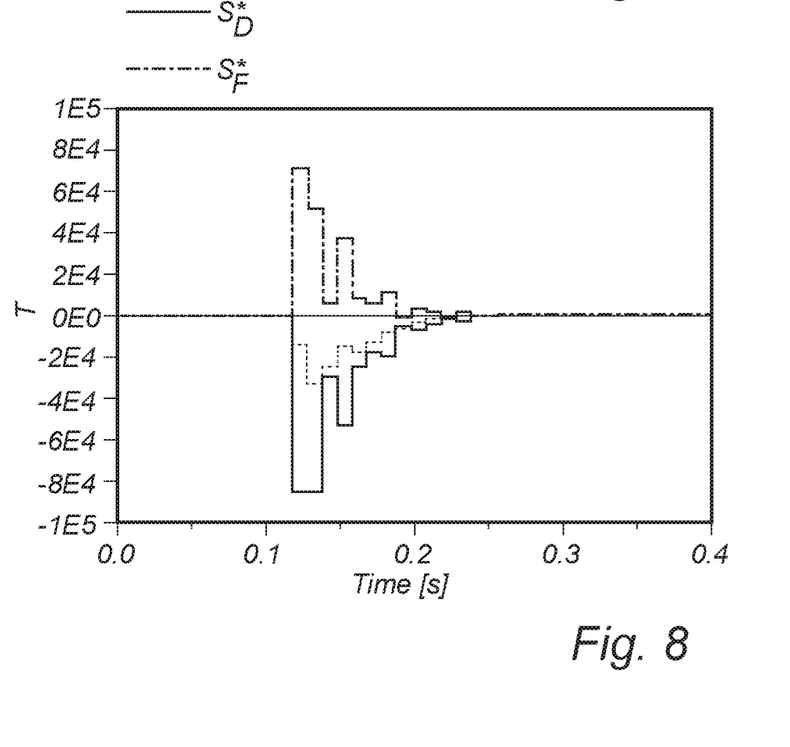
FIG. 8 is a diagram schematically illustrating signals of a system according to an embodiment of the invention.

FIG. 8 is a diagram illustrating $S_2^*$ together with the formed delay compensation signal $S_D^*$ which has been delayed and thereby synchronized with $S_2^*$, and the resulting feedback signal $S_F^*$ to be provided to the rotating mass 106.

Even though the invention has been described with reference to specific exemplifying embodiments thereof, many different alterations, modifications and the like will become apparent for those skilled in the art. Also, it should be noted that parts of the co-simulation method and system may be omitted, interchanged or arranged in various ways, the method and system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method of providing stable communication between subsystems in a co-simulation system comprising a plurality of subsystems, each subsystem representing a physical system of a vehicle, the method comprising:
   in a first subsystem of the co-simulation system, simulating a first physical system, providing a first time continuous signal $S_1$ describing a first output angular velocity of a rotating body of the first physical system; filtering the first time continuous signal $S_1$ using a continuous moving average, CMA, filter and forming a time discrete first output signal $S_1^*$;
   in a second subsystem of the co-simulation system, simulating a second physical system, receiving the time discrete first output signal $S_1^*$ from the first subsystem, applying the angular velocity described by the time discrete first output signal $S_1^*$ to the second physical system, and providing a time discrete response signal $S_2^*$ from the second subsystem describing a torque generated by the second subsystem;
   in the first subsystem, receiving the response signal $S_2^*$ and forming a time discrete feedback signal $S_F^*$ based on the difference between the response signal $S_2^*$ and a time discrete damping signal $S_D^*$, wherein forming the damping signal $S_D^*$ comprises applying an inertia to the rotating body of the first physical system, resulting in a time continuous damping signal $S_D$ representing a torque, followed by filtering the time continuous damping signal $S_D$ using a CMA-filter and applying a unit delay to form the time discrete damping signal $S_D^*$, thereby synchronizing $S_D^*$ with $S_2^*$; and
   applying the time discrete feedback signal $S_F^*$ as a torque to the rotating body.

2. The method according to claim 1, wherein the inertia is modeled by a spring-damper resonator system.

3. The method according to claim 2, wherein a natural frequency of the spring damper resonator system is higher than a Nyquist frequency for a sampling rate of the co-simulation system.

4. The method according to claim 1, wherein the continuous moving average, CMA, filter is an energy conserving filter.

5. The method according to claim 1, wherein the co-simulation system simulates an automotive transmission system.

6. The method according to claim 1, wherein the inertia is an estimated inertia based on a torque output from the second subsystem.

7. The method according to claim 1, further comprising, in the first subsystem:
   determining a time discrete acceleration signal $A_1^*$ of the first time discrete output signal $S_1^*$;
   filtering the time discrete acceleration signal $A_1^*$ with a time discrete moving average, DMA, filter;
   determining a torque of the second subsystem from the response signal $S_2^*$; and estimating the inertia based on the time discrete acceleration signal $A_1^*$ and the torque from the time discrete response signal $S_2^*$.

8. The method according to claim 1, further comprising:
determining a time discrete acceleration signal $A_1^*$ of the first time discrete output signal $S_1^*$;
filtering the time discrete acceleration signal $A_1^*$ with a time discrete moving average, DMA, filter;
determining a discrete time derivative of the acceleration signal $A_1^*$;
determining a discrete time derivative of the response signal $S_2^*$; and
estimating the inertia based on the discrete time derivative of the acceleration signal $A_1^*$ and the discrete time derivative of the response signal $S_2^*$.

9. A co-simulation system comprising a plurality of subsystems, each subsystem representing a physical system of a vehicle, the co-simulation system comprising:
a first subsystem of the co-simulation system, configured to simulate a first physical system, providing a first time continuous signal $S_1$ describing a first output angular velocity of a rotating body of the first physical system;
a continuous moving average, CMA, filter configured to filter the first time continuous signal $S_1$ to form a time discrete first output signal $S_1^*$;
a second subsystem of the co-simulation system, configured to simulate a second physical system, the second subsystem being configured to receive the time discrete first output signal $S_1^*$ from the first subsystem, apply the angular velocity described by the time discrete first output signal $S_1^*$ to the second physical system, and to provide a time discrete response signal $S_2^*$ from the second subsystem describing a torque generated by the second subsystem;
the first subsystem being further configured to:
receive the response signal $S_2^*$ and to form a time discrete feedback signal $S_F^*$ based on the difference between the response signal $S_2^*$ and a time discrete damping signal $S_D^*$, wherein the damping signal $S_D^*$ is formed by applying an inertia to the rotating body of the first physical system, resulting in a time continuous damping signal $S_D$ representing a torque, followed by filtering the time continuous damping signal $S_D$ using a CMA-filter and applying a unit delay to form the time discrete damping signal $S_D^*$, thereby synchronizing $S_D^*$ with $S_2^*$; and
apply the time discrete feedback signal $S_F^*$ as a torque to the rotating body.

10. The co-simulation system according to claim 9, wherein the first subsystem further comprises a spring-damper resonator system configured to model the inertia.

11. The co-simulation system according to claim 10, wherein the spring-damper resonator system is configured such that a natural frequency of the spring damper resonator system is higher than a Nyquist frequency for a sampling rate of the co-simulation system.

12. The co-simulation system according to claim 9, wherein the co-simulation system simulates an automotive transmission system.

13. The co-simulation system according to claim 9, wherein the inertia is an estimated inertia based on a torque output from the second subsystem.

14. The co-simulation system according to claim 9, wherein the first subsystem is further configured to:
determine a time discrete acceleration signal $A_1^*$ of the first time discrete output signal $S_1^*$;
filter the time discrete acceleration signal $A_1^*$ with a time discrete moving average, DMA, filter;
determine a torque of the second subsystem from the response signal $S_2^*$; and
estimate the inertia based on the time discrete acceleration signal $A_1^*$ and the torque from the time discrete response signal $S_2^*$.

15. The co-simulation system according to claim 9, wherein the second subsystem is black box system.

* * * * *